June 12, 1951 — R. P. MOORE — 2,556,771
APPARATUS FOR MAINTAINING A CONSTANT LIQUID LEVEL
Filed Feb. 13, 1945
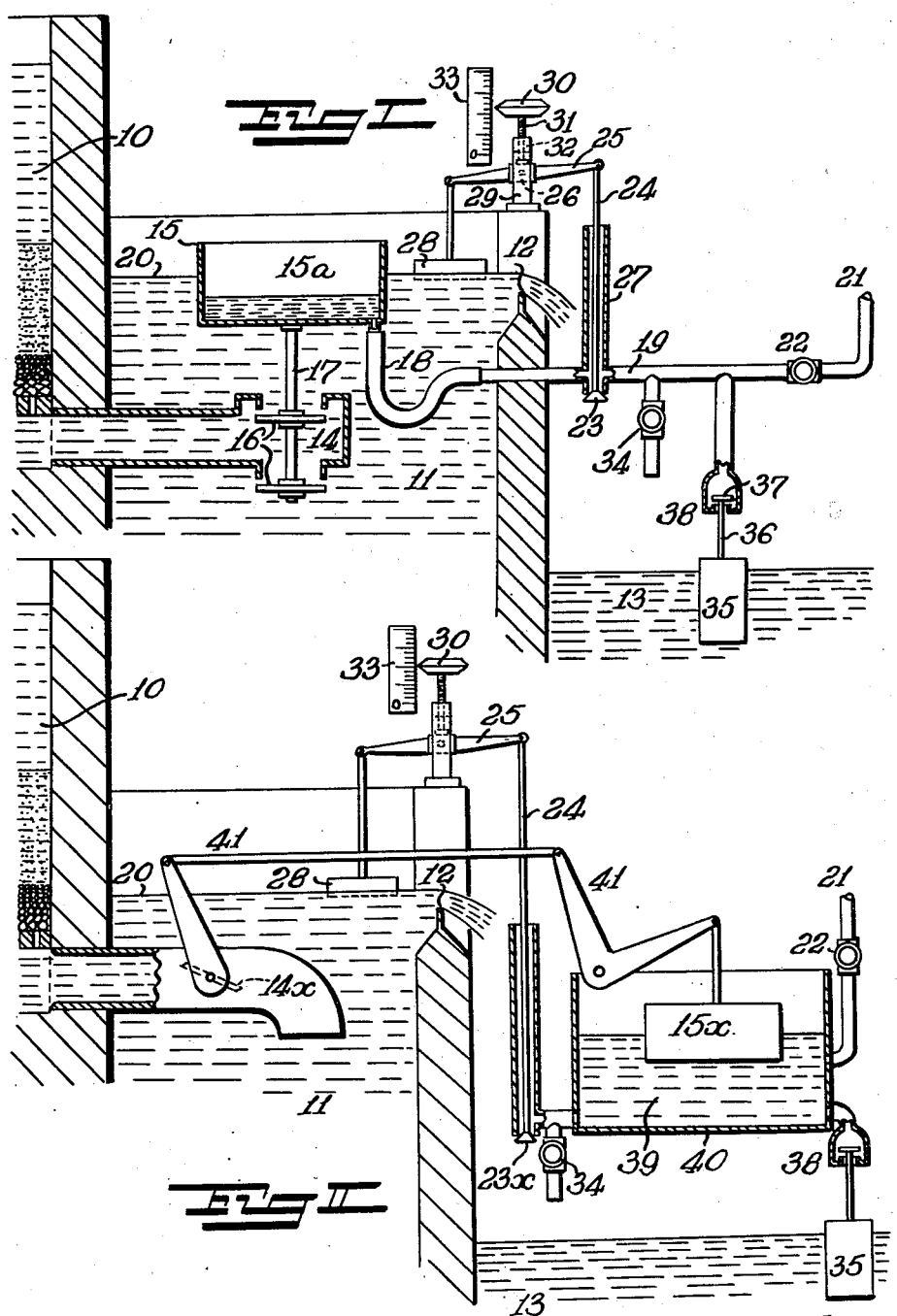
Inventor
R. P. Moore Patented June 12, 1951

2,556,771

UNITED STATES PATENT OFFICE 2,556,771

APPARATUS FOR MAINTAINING A CONSTANT LIQUID LEVEL

Richard Pierpont Moore, Roodekop, Germiston, Transvaal, Union of South Africa

Application February 13, 1945, Serial No. 577,671
In the Union of South Africa March 11, 1944

26 Claims. (Cl. 137—68)

This invention relates to liquid control apparatus comprising a liquid-containing tank having means for inflow and outflow of liquid and adjustable valve means controlling the balance of inflow and outflow so as to affect the level of the liquid in the tank, the adjustment of the valve means being governed by the upward and downward movement of a float in the tank.

The general object of the invention is to enable the level of the liquid in the tank to be kept constant within small limits.

A more specific object of the invention is to provide an improved rate-of-flow controller suitable for water treatment plants. A further object is to provide apparatus suitable for such plants that performs the functions both of a rate-of-flow controller and of a slow start apparatus. Another object is to provide for the control of such apparatus from a distant point.

The invention consists in the combination with a liquid-containing tank having means for inflow and outflow of liquid, of valve means adjustable to vary the balance of inflow and outflow, a servo-motor actuating said valve means, and a pilot float floating in the tank to participate in variation of level of the liquid in the tank; the combination of said servo-motor and valve means being arranged so to react to departure of the pilot float either way from a datum level position as to cause the balance of inflow and outflow to be one that operates to restore the datum level.

The servo-motor preferably comprises a floating motor float that is capable of buoyant rising and falling movement and actuates the valve means by such movement. Said servo-motor float derives its energy from a constantly available source of supply of liquid provided for that purpose; and the vertical movements of the motor float in opposite directions are brought about respectively by passing liquid from said source to a container with which the motor float is associated, and by draining liquid from said container. The balance between the supply to the container and draining therefrom (which includes zero value) is governed by the position of the pilot float with reference to its datum level position. The pilot float may control a valve arrangement capable of assuming a neutral position in which there is no flow to or from the container and positions on either side of said neutral position in which there is respectively flow to and flow from the container.

In one form of the apparatus, the motor float is of invariable buoyancy and floats in the aforesaid container so as to be raised by rise of the liquid in the container when liquid is supplied to the container and to fall by draining of liquid from the container.

In another form of the apparatus, the movements of the motor float are brought about by varying its buoyancy. In this case the motor float provides the liquid container so that supply of liquid to the container reduces the buoyancy of the motor float, whilst draining of liquid from the container increases the buoyancy of the motor float. It is not necessary that the liquid in which this form of motor float floats should change its level, and that fact enables the motor float to be floated in the liqiud in the tank in which the liquid level is to be maintained constant. In that case it is preferable to arrange for the motor float to decrease its buoyancy and therefore sink, when the level in the tank falls; and vice versa.

Direct coupling of the container motor float to an inlet valve that feeds the tank is possible if said valve is arranged to close by rise of the closure member. The float container may be connected by a flexible hose to a stationary conduit which is in open connection with the source of loading liquid and with the draining means. It is convenient for the rate of flow from the source to remain constant and to provide a valve governed by the pilot float for draining such liquid.

In applying apparatus as described to the production of a rate-of-flow controller, the tank outlet is constantly open and is such that the rate of flow through it is proportional to the head of liquid above it, and the inflow to the tank is liable to variation of effective head. The valve means governs the inflow to the tank; and the system which comprises the pilot float, the motor float and the means that varies the net inflow to or outflow from the container, operates to correct variation of level of the liquid in the tank by governing the degree of opening of said inlet valve. It is preferred to provide a weir as the outlet from the tank. Such an arrangement may be provided in connection with a filter chamber having means for maintaining constant liquid level therein; the valve controlling flow from said filter chamber to the weir chamber.

A rate-of-flow controller according to the invention also consists in a tank having a weir outlet, a valve through which liquid flows into the tank, said valve being adjustable to vary the extent of its opening, and means rendered active by non-coincidence of the liquid level in the tank with a datum level to adjust the valve opening, while the non-coincidence exists, in the manner tending to produce coincidence.

In order to vary the datum level point in the tank the connection between the pilot float and the means governed by it is made adjustable.

In connection with the apparatus of the rate-of-flow type as described, there may be included a vessel through which the liquid that flows through the tank also passes. An additional valve permitting outflow from the container is provided; and a float in said vessel is arranged to open said additional valve with rise of the liquid level in said vessel. Said valve is preferably arranged to offer substantial resistance to movement of its closure member. In particular, the opening movement of the closure member is resisted by pressure on it of the liquid which it controls.

The invention is illustrated in the accompanying drawings in which:

Figure I is a diagrammatic representation of a rate-of-flow controller in a water filtering plant, which is also arranged to act as a slow start apparatus and to be itself controlled from a distant point.

Figure II shows the plant of Figure I modified in details.

In the drawings, 10 indicates the filter chamber of a water filtration plant. The effluent from the filter passes in the usual manner to the weir chamber 11 and flows away over the weir 12 to the filtered water reservoir 13. The flow from 10 to 11 is under control of the valve 14. The opening and closing movement of valve 14 is brought about by the motor float 15 which floats in the weir chamber 11. The valve 14 closes by upward movement of its closure member 16; and the float 15 is directly connected to said closure member by the rod 17; so that upward movement of the float causes the valve to close, and vice versa.

The float 15 is constructed to provide an internal container 15a adapted to contain water. A flexible hose 18 connects said container 15a to a fixed conduit 19. By feeding water into the float container 15a through said conduit 19 and hose 18, the float 15 is caused to sink relatively to the surface 20 of the water in tank 11 irrespective of the level of said surface 20; and similarly withdrawal of water through 18, 19 causes the float 15 to rise with reference to the surface 20.

21 is a water supply pipe, controlled by the manually adjustable valve 22, whereby a flow of water is continually available at the conduit 19 for loading the container 15a. The conduit 19 is provided with an outflow valve 23 as shown controlling an opening of greater diameter than that of the conduit; and the loading or unloading of the container 15a is determined by the setting of said outflow valve 23.

Said valve 23 closes upward and is connected by rod 24 to one end of a motion reversing lever 25 pivoted to a fulcrum block 26. The rod 24 extends upward through a tube 27 having an open upper end higher than the maximum level of the water in container 15a. The other end of the lever 25 is connected to the pilot float 28, of invariable buoyancy, that floats on the surface 20. The fulcrum block 26 is mounted in a guide 29 which allows it to be raised and lowered and is adjustable by means of the hand wheel 30 secured to a screw spindle 31 which is engaged in a fixed nut 32 at the top of the guide 29 and is rotatably connected to the block 26.

The vertical setting of the fulcrum block is indicated by the position of the hand wheel 30 relatively to a scale 33. Communicating with conduit 19 is a branch having a valve 34 therein which is a hand actuated valve and by means of which the conduit 19 may be drained non-automatically, and which valve 34 is normally kept closed.

The apparatus described operates as follows to maintain constant level in the tank 11. When the apparatus is in equilibrium under any set of conditions that causes inflow to and outflow from tank 11 to be equal, the float 15 is loaded to hold the valve 14 open to the extent that the flow through 14 maintains the surface 20 at the datum level above the weir 12. The pilot float 28 is at its datum level position; at which position it holds the valve 23 open to the extent that causes outflow through said valve to be equal to inflow from 21; so that no water is loaded into or drained from container 15a.

In the event of conditions changing in such a way that the surface 20 is lowered, pilot float 28 falls with it and decreases the opening of valve 23. Some of the constant flow from 21 accordingly passes into container 15a, thus additionally loading the float 15 and reducing the buoyancy of said float so that it sinks relatively to surface 20, and additionally to its sinking due to the fall of said surface 20. By thus sinking it increases the opening of valve 14; and the resulting greater inflow to tank 11 causes the surface 20 to rise until it again resumes its datum level. Pilot float 28 is thereby brought back to its datum level and in turn restores valve 23 to its position of equilibrium in which position there is no loading or unloading of float 15. Float 15 retains the additional load it received and remains correspondingly sunk to maintain the extra opening of valve 14 as long as the conditions persist that necessitated such extra opening.

Upon such conditions ceasing to exist the extra opening of 14 will admit more water than is required to maintain the datum level; and the surface 20 will rise above datum level. In that event or in any event that causes surface 20 thus to rise above datum level, float 28 rises from its datum position and increases the opening of valve 23, which in turn causes unloading of the container 15a and increase of the buoyancy of float 15. Said float 15 accordingly rises and decreases the opening of valve 14. The resulting reduced inflow through 14 allows excess liquid in 11 to flow away over the weir 12; with consequent fall of float to datum level and restoration of valve 23 to its position of equilibrium. Float container 15a remains without alteration of its partially unloaded state until conditions change again.

The operation of the apparatus described as a rate-of-flow controller, results from the servo-motor enabling the datum level to be restored with a high degree of accuracy and from the chamber 11 being a weir chamber from which the outflow is acurately proportional to the head above the weir 12. The effect of the gradually increasing resistance of the filter is to decrease progressively the head available at the inlet side of valve 14 to force the water through said valve, with resulting tendency for the flow through said valve 14 to decrease. The level of surface 20 tends accordingly to be always slightly below datum level; and as long as that is the case, valve 23 is shifted from its position of equilibrium in the direction that causes inflow to the container 15a. Float 15 accordingly tends to continue to sink progressively—without the necessity of surface 20 changing its slightly lowered position—and progressively to increase the opening of valve 14 to compensate for the progressively decreasing head at the inlet of said valve 14.

The purpose of the adjustable fulcrum 26 is to alter the magnitude of the rate of flow which the rate-of-flow controller maintains constant, or in other words to increase or decrease the constantly flowing output of the filter. If the fulcrum 26 is raised relatively to the float 28 regarded as a stationary body, the immediate effect is to diminish the opening of and outflow through 23, thereby loading the float 15 and, as mentioned above, increasing the opening of valve 14. This causes the level of the water surface 20 to rise, lifting 28 and increasing the opening of 23 until inflow to and outflow from container 15a are again equalized but with more load in said container 15a. Float 15 reacts on valve 14 to stabilize the combination of 15 and 14 but with the surface 20 stable at a higher level above the weir 12, so that the flow through the weir chamber 11 and consequently through the filter 10, is increased.

In an analogous manner, lowering of the fulcrum 26 causes the output of the filter to be decreased; but in neither case is there interference with the automatic operation of the rate-of-flow control.

A useful effect of the apparatus described is that the loading and unloading of the float 15 takes time and the rate at which the valve 14 opens or closes is correspondingly regulated, so that unduly rapid opening or closing of said valve 14 can readily be avoided. In the operation of the filter 10 it is important that the valve 14 should not be opened so rapidly as to set up disturbing influences in the filter bed. The rate of opening the valve 14 is dependent on the rate of loading the float 15 which in turn is regulated by the extent of opening of the valve 22.

When the flow through the apparatus has been stopped for any purpose such as that of cleaning the filter 10, the float container 15a is left unloaded. The flow may be stopped by for instance opening valve 34 which drains the container 15a. The float 15 is at its maximum buoyancy and holds valve 14 closed. Upon the apparatus being restarted, which may be done by closing valve 34, the container 15a refills gradually and gradually re-opens valve 14; thus causing the apparatus to function as a slow-start apparatus. The valve 22 is available to regulate the rate at which the loading water is supplied to the container 15a. As soon as the slow start has been completed, the apparatus automatically resumes its function as a rate-of-flow controller.

During the operation of the filter, the storage reservoir 13 may become full; in which case it is necessary to stop the flow through the filter 10. For this purpose there is provided the float 35 connected by the rod 36 to the closure member 37 of a valve 38 which is opened by upward movement of its said closure member 37. When the reservoir 13 is not overfilled, the float 35 hangs from the closure member 37 and holds the valve 38 closed. Upon the water in 13 rising above normal level, the float 35 lifts the closure member and opens the valve 38.

Said valve 38 is a drainage valve arranged, like the drainage valve 23, to unload the float 15. Opening of valve 38 by thus unloading the float 15, causes the latter to rise and close the valve 14. Closing of valve 14 reacts on the automatic inlet valve of the filter 10 to stop the flow through the plant.

A special feature of the valve 38 is that its closure member 37 is pressed against its seat by the head of water in the pipe system to which said valve 38 is attached; so that the float 35 has to overcome said pressure before it can open valve 38. The result is that as the water in reservoir 13 rises, the valve 38 remains closed until the float has accumulated to extra buoyancy necessary to lift the closure member; during which time the level in 13 has continued to rise. The valve 38 then opens suddenly and completely, causing the container 15a to be rapidly unloaded and the valve 14 to be closed promptly and completely.

During the ensuing descent of the water level in 13, the valve 38 remains open for a period until the surplus buoyancy of float 35 has disappeared; during which period said level has fallen to a substantial extent. The resumption of flow through the apparatus consequently occurs at full flow rate and continues at that rate until 13 has re-filled to the substantial extent necessary to re-open valve 38. The area of the closure member 37 and the length of float 35 in relation to its diameter are factors that may be adjusted in order to determine the difference between the levels in 13 at which the flow through the apparatus respectively starts and stops.

The essential difference between the apparatus of Figure I and that of Figure II is that in the latter, the motor float 15x is of invariable buoyancy and floats in a body of water 39 in a cistern 40 isolated from tank 11. Float 15x is caused to rise by admitting water from 21 to the cistern 40; and it is caused to fall by draining water from cistern 40 through valve 23x which is the equivalent of valve 23 of Figure I and is actuated, as in the Figure I case, by the pilot float 28 in tank 11. The motor float 15x is connected to the inlet valve 14x by the transmission device 41 in such a way that rise and fall of float 15x respectively open and close valve 14x; so that the effect of rise or fall of pilot float 28 is the same in both the Figure 1 and the Figure 2 apparatus.

The important utility of providing the motor float 15 or 15x is that the latter relieves the float 28 of all motive functions except that of operating valve 23 or 23x. As the work to be done in moving said valve 23 or 23x is very small, the accuracy and sensitiveness of the level control is correspondingly enhanced.

The energy required for actuating the valve 14 or 14x is available in indefinite quantity from the source 21. So long as valve 23 or 23x is not in its datum position in which the outflow through it is exactly equal to the inflow from 21, energy from 21 is active to move the motor float in the direction necessary to restore the surface 20 to its datum position. It follows that such restoration can be attained with a high degree of accuracy, subject only to any small lack of correspondence of float 28 to the water surface 20 set up by any resistance that there may be to the movement of said float 28.

I claim:

1. The combination with a liquid-containing tank having means for inflow and outflow of liquid, of valve means adjustable to vary the balance of inflow and outflow, pilot means responsive to variation of the liquid level in the tank, a servo-motor for adjusting the valve means comprising a motor float arranged for buoyant rising and falling movement on a body of liquid and providing a container to hold liquid that loads the float, means for supplying loading liquid to said float container and draining it therefrom and thereby causing the motor float to sink or rise respectively in the body of liquid, said last-mentioned means being so governed by the movement of the pilot means either way from its position corresponding to a datum level in the tank as to cause such vertical movement of the motor float as will adjust the valve means in the manner operative to restore said datum level.

2. The apparatus claimed in claim 1, in which the motor float floats at the surface of the liquid in the tank.

3. The combination with a liquid-containing tank having means for inflow and outflow of liquid, of valve means adjustable to vary the balance of inflow and outflow, pilot means responsive to variation of the liquid level in the tank, a servo-motor for adjusting the valve means comprising a motor float arranged for buoyant rising and falling movement on the liquid in the tank and providing a container to hold liquid that loads the motor float, means governed by the pilot means to supply loading liquid to the float container upon descent of the liquid surface in the tank and to drain the float container upon ascent of the liquid in the tank, said motor float thereupon operating the valve means in the manner operative to restore the liquid level in the tank.

4. The combination with a liquid-containing tank having means for inflow and outflow of liquid, an inlet valve adjustable to govern the rate of inflow to the tank, pilot means responsive to variation of the liquid level in the tank, a servo-motor for adjusting the valve means comprising a motor float arranged for buoyant rising and falling movement on the liquid in the tank and providing a container to hold liquid that loads the motor float, means governed by the pilot means to supply loading liquid to the float container upon descent of the liquid surface in the tank and to drain the float container upon ascent of the liquid surface in the tank, the inlet valve comprising a closure member that closes upward and is connected to the motor float to participate in the vertical movements of the latter.

5. The combination with a liquid-containing tank having a weir outlet, an adjustable valve controlling inflow to the tank, pilot means responsive to variation of the liquid level in the tank, a servo-motor for adjusting the valve means comprising a motor float arranged for buoyant rising and falling movement, and thereby adjusting the opening of the inflow valve, a container associated with the motor float, means for supplying motive liquid to said container and draining it therefrom and thereby causing opposite movements of the motor float, said last-named means comprising a draining valve actuated by movement of the pilot means in accordance with variation of liquid level in the tank, a vessel through which passes the liquid that flows through the tank, a float in said vessel, and an additional valve capable of draining the container and opened by rise of the float in the vessel.

6. The combination with a liquid-containing tank having a weir outlet, an adjustable valve controlling inflow to the tank, pilot means responsive to variation of the liquid level in the tank, a servo-motor for adjusting the valve means comprising a motor float arranged for buoyant rising and falling movement, and thereby adjusting the opening of the inflow valve, a container associated with the motor float, means for supplying motive liquid to said container and draining it therefrom and thereby causing opposite movements of the motor float, said last-named means comprising a draining valve actuated by movement of the pilot means in accordance with variation of liquid level in the tank, a vessel through which passes the liquid that flows through the tank, a float in said vessel, and an additional valve arrangement capable of draining the container and opened by rise of the float in the vessel, said additional valve offering substantial resistance to opening.

7. The subject matter of claim 6, in which the additional draining valve arrangement comprises a closure member and a seat, and said closure member is so arranged that when it is seated on the seat, it is pressed thereto by the liquid controlled by the valve.

8. The combination with a liquid-containing tank having means for inflow and outflow of liquid, of valve means adjustable to vary the balance of inflow and outflow, a pilot device responsive at all times to variation of the level of the liquid in the tank either way with respect to a datum level, a servo-motor for adjusting said valve means including a motor float having container means for liquid associated therewith, the float being capable of rising and falling movement and thereby adjusting the valve means by such movement, the variation of a liquid level in the container means causing corresponding upward and downward movement of the motor float, a control valve arrangement including at least a valve connected to and at all times actuatable by the pilot device and positioned with respect to the container means so that the head of liquid therein acts in a valve opening direction, thereby controlling the net flow of liquid relative to the container means so that such flow is inward, is zero, or is outward from the container means corresponding to the response of the pilot device to the level in the tank so as to tend to restore or maintain the datum level in the tank, and means for supplying a source of liquid under pressure for the container means from a source available at all times to flow relative to the container means under the control of the control valve arrangement.

9. The apparatus claimed in claim 8, in which the motor float is of variable buoyancy and floats in the liquid in the tank.

10. The combination with a liquid-containing tank having means for inflow and outflow of liquid, of valve means adjustable to vary the balance of inflow and outflow, a pilot device responsive at all times to variation of the level of the liquid in the tank either way with respect to a datum level, a servo-motor comprising a floating motor float that is capable of rising and falling movement and that adjusts the valve means by such movement, a liquid container other than the tank and variation of the liquid level in which causes corresponding upward and downward movement of the motor float, means for supplying liquid independent of the liquid in the tank to the container and control means for said supply means including at least one adjustable drain valve so positioned that the head of liquid in the container acts in a valve opening direction and adapted to drain liquid from the container and at all times operably associated with and actuatable by the pilot device, and so controlling the net flow relative to the container that such flow is inward to the container, or is zero, or is outward from the container, corresponding with the response of the pilot device to the level in the tank; and so as to tend at all times to cause the restoration or maintenance of the datum level in the tank.

11. The apparatus as claimed in claim 8, in which the connection between the pilot device and the valve governed by said pilot device is adjustable so that the datum level point may be varied.

12. The combination with a liquid-containing tank having means for inflow and outflow of liquid, of valve means adjustable to vary the balance of inflow and outflow, a pilot device responsive at all times to variation of the level of the liquid in the tank either way with respect to a datum level, a servo-motor comprising a floating motor float that is capable of rising and falling movement and that adjusts the valve means by such movement, a liquid container other than the tank and variation of the liquid level in which causes corresponding upward and downward movement of the motor float, a container control valve arrangement operably associated with and at all times actuatable by the pilot device and so controlling the balance of flow relative to the container that the net flow is inward to the container or is zero or is outward from the container correspondingly with the response of the pilot device to the level in the tank and so as to tend to restore or maintain the datum level in the tank, and means for supplying liquid from a source of liquid at all times available under pressure and independent of the liquid in the tank to enter and leave the container under the control of the control valve arrangement, including at least one additional container control valve arrangement which also controls the net flow relative to the container so that such flow is inward to the container or is zero or is outward from the container and means independent of the pilot device for operating said additional valve arrangement.

13. The apparatus claimed in claim 12 in which the additional container control valve arrangement includes a manually operable valve.

14. The apparatus claimed in claim 12, in which the additional container control valve arrangement includes an adjustable drain valve adapted to drain liquid from said supply and from the container.

15. The combination with a liquid-containing tank having means for inflow and outflow of liquid, or valve means adjustable to vary the balance of inflow and outflow, a pilot device responsive at all times to variation of the level of the liquid in the tank either way with respect to a datum level, a servo-motor comprising a floating motor float that is capable of rising and falling movement and that adjusts the valve means by such movement, a liquid container other than the tank and variation of the liquid level in which causes corresponding upward and downward movement of the motor float, a container control valve arrangement separated from the container cavity and at all times actuatable by the pilot device and so controlling the flow to and from the container that such flow is inward to the container or is zero or is outward from the container correspondingly with the response of the pilot device to the level in the tank and so as to tend to restore or maintain the datum level in the tank, means for supplying liquid from a source of liquid at all times available under pressure to enter and leave the container under the control of the control valve arrangement, an additional container control valve arrangement including at least one drainage valve which so controls the net flow relative to the container that such flow is inward to the container or is zero or is outward from the container, a third liquid-containing vessel, and a float in said latter vessel, the said valve of the additional container control valve arrangement being actuated by said last-named float.

16. The apparatus claimed in claim 15, in which the vessel is one through which the liquid that flows through the tank also passes, and in which the float in said vessel opens said additional drainage valve with rise of the liquid level in the vessel.

17. The apparatus claimed in claim 15, in which the vessel is one through which the liquid that flows through the tank also passes, and in which the float in said vessel opens said additional drainage valve with rise of the liquid level in the vessel, said additional drainage valve offering substantial resistance to movement of its closure member.

18. The apparatus claimed in claim 15, in which the vessel is one through which the liquid that flows through the tank also passes, and in which the float in said vessel opens said additional drainage valve with rise of the liquid level in the vessel, the opening movement of the closure member of said additional drainage valve being resisted by pressure on it of the liquid which it controls.

19. The combination with a liquid-containing reservoir, of a motor float free for buoyant rising and falling movement on the liquid in the reservoir, the motor float providing a liquid container such that liquid in said container is a load on the motor float, adjustable means for feeding liquid to and draining liquid from the container and thereby varying the loading of the motor float, and movable power-consuming means connected to the motor float to be actuated by change of elevation of the motor float.

20. The apparatus claimed in claim 19, comprising a flexible conduit connecting the interior of the container to fixed parts, said fixed parts including valve means to control liquid flow through the conduit alternatively towards and from the container.

21. The combination with a liquid-containing reservoir, of a motor float free for buoyant rising and falling movement on the liquid in the reservoir, the motor float providing a liquid container such that liquid in said container is a load on the motor float, adjustable means giving selection of any one of the three steps of feeding liquid to the container, draining liquid from the container, and stopping flow to or from the container, and further means movable through a range of positions and producing different effects according to its position in that range, said further means being connected to the motor float to be moved in said range by the motor float.

22. An apparatus as defined in and by claim 12 and in which the additional control valve arrangement includes a manually operable supply valve, a manually operable drainage valve, and a float operable drainage valve.

23. An apparatus of the type described including a liquid receiving tank having an inlet and an outlet therefrom, and valve means controlling the inlet and thereby the flow to and through and the level in the tank, float operated means for actuating said valve including means providing a liquid chamber and means in communication with said chamber providing a liquid flow thereto from a continuously flowing source of liquid under pressure and independent of the liquid in the tank, the liquid supplied to the chamber providing a liquid level therein determining the position of the inlet valve means and thereby the amount of flow to and through the tank, valve means independent of the first-mentioned valve means and including at least one drainage valve for controlling the level of liquid in the chamber, a pilot float floating on the liquid in the tank and operably connected with said drainage valve means to adjust the same in accordance with the position of the liquid level in the tank, a manually operable valve connected with the chamber so as to permit draining of the liquid therefrom, the lowering of the liquid in the chamber moving the inlet valve means to closed position, a second manually operable valve controlling flow to said chamber and positioned in advance of said other valves, means defining a receptacle for receiving the liquid from the outlet of the tank, a float in said receptacle and an additional drainage valve operably associated with said chamber and connected with said float in the receptacle, said last-mentioned valve being normally closed and opened upon rising movement of the float responsive to rising of liquid level in the receptacle.

24. An apparatus of the type described including a vertically positioned tank having an inlet thereinto and an outlet at an upper level therefrom, valve means controlling the inlet and thereby the level of liquid in the tank, means defining a combined float chamber and liquid chamber including vertical walls and a bottom with the walls being of such height as to provide a volumetric capacity capable of receiving liquid and providing an air space above the liquid to constitute a float, said means floating in the liquid in the tank and directly connected with said valve controlling the inlet, a combined liquid supply and discharge line communicating with the bottom of said chamber and through which liquid passes to provide a variable level within the chamber, a double arm lever, vertically movable fulcrum means for said lever, a pilot float floating on the liquid in the tank connected to one arm of said double arm lever, means for vertically moving the fulcrum of said double arm lever for vertical adjustment of the pilot float, said line extending exteriorly of the tank and adapted for communication with a source of liquid under pressure independent of the liquid in the tank, a first main valve in said line governing admission of flow from the source to the chamber, a discharge opening in said line between the chamber and said first-mentioned valve in the line, a liquid level controlling valve for said discharge opening, said valve being directly connected with the other arm of said double arm lever and movable in response to the movement of the float responsive to the liquid level in the tank and said discharge opening being of greater diameter than the diameter of the line so that the valve controlling discharge from the line can assume positions including a position in which liquid flows through the line and out the discharge opening at a constant rate thereby maintaining a constant level in said chamber, a position in which liquid flows through the discharge opening at a greater rate than through the line thereby emptying the chamber and a closed position in which liquid flows into the chamber to increase the liquid level therein and the liquid level in the chamber thereby determining the position of the inlet valve means.

25. An apparatus as defined in and by claim 24 and at least one additional drain valve in communication with the said line between said first-mentioned main valve therein and the said discharge valve controlled by said pilot float.

26. An apparatus of the type described including a vertically disposed liquid receiving tank having an inlet and an outlet at an upper level therefrom, valve means controlling the inlet and thereby the level in the tank, a liquid receiving chamber exteriorly of the tank, valved means communicating with said chamber for supplying the same with liquid from a source independent of the liquid in the tank and under pressure, a float in said chamber responsive to the liquid level therein, lever means connecting said float with the valve controlling the inlet to the tank whereby said inlet valve is movable in response to the movement of the float in the chamber, at least one conduit leading from said chamber and having a discharge opening therein of greater diameter than the diameter of the conduit, a discharge valve controlling said discharge opening, lever means including a vertically adjustable fulcrum directly connected at one end to the valve controlling the discharge opening, a pilot float connected to the other end of said lever means, said pilot float and thereby said discharge valve being movable responsive to the liquid level in the tank, and said discharge valve assuming positions including a position in which liquid flows through the line and out the discharge opening at a constant rate thereby maintaining a constant level in said chamber, a position in which liquid flows through the discharge opening at a greater rate than through the line thereby emptying the chamber and a closed position in which liquid flows into the chamber to increase the liquid level therein and the liquid level in the chamber thereby determining the position of the inlet valve means.

RICHARD PIERPONT MOORE.

REFERENCES CITED

The following references are of record in the file of this patent:

UNITED STATES PATENTS

| Number | Name | Date |
|---|---|---|
| 917,381 | Twiford | Apr. 6, 1909 |
| 927,899 | Sutherland | July 13, 1909 |
| 937,728 | Twiford | Oct. 19, 1909 |
| 1,536,055 | Bartlett | May 5, 1925 |
| 1,997,970 | Hutchinson | Apr. 16, 1935 |

FOREIGN PATENTS

| Number | Country | Date |
|---|---|---|
| 231,603 | Great Britain | Apr. 9, 1925 |
| 552,923 | Germany | June 20, 1932 |